United States Patent

Schmid et al.

[15] 3,638,244
[45] Feb. 1, 1972

[54] WATER CLOSET

[72] Inventors: John H. Schmid; Arthur E. Thomas, both of Erie, Pa.

[73] Assignee: Zurn Industries, Inc., Erie, Pa.

[22] Filed: Apr. 6, 1970

[21] Appl. No.: 25,896

[52] U.S. Cl. ............................................4/17, 4/78, 4/84
[51] Int. Cl. ..................................E03d 5/01, E03d 5/016
[58] Field of Search ............4/7, 12, 17, 76, 84, 85, 90, 4/107, 110, 111, 116, 128–130, 138, 141, 223, 224, DIG. 2

[56] References Cited

UNITED STATES PATENTS

| 1,017,044 | 2/1912 | Fraser | 4/76 |
| 3,251,068 | 5/1966 | Milette et al. | 4/78 |

FOREIGN PATENTS OR APPLICATIONS

| 381,083 | 10/1907 | France | 4/12 |
| 471,281 | 9/1937 | Great Britain | 4/78 |

*Primary Examiner*—Robert G. Nilson
*Attorney*—McNenny, Farrington, Pearne & Gordon

[57] ABSTRACT

A water closet for collecting and disposing of waste materials is disclosed. The water closet includes a receptacle having a top opening therein. A bowl is mounted within the top opening and the bowl is adapted to be pivoted from a position wherein the interior of the bowl faces upwardly to collect waste to a position wherein the bowl faces downwardly to empty the contents of the bowl into the receptacle. A spray head is located beneath the bowl to direct a flushing solution against the interior of the blow when the bowl is in its inverted position.

22 Claims, 5 Drawing Figures

PATENTED FEB 1 1972

INVENTORS
JOHN H. SCHMID,
& ARTHUR E. THOMAS
BY
McNENNY, FARRINGTON, PEARNE & GORDON

ATTORNEYS

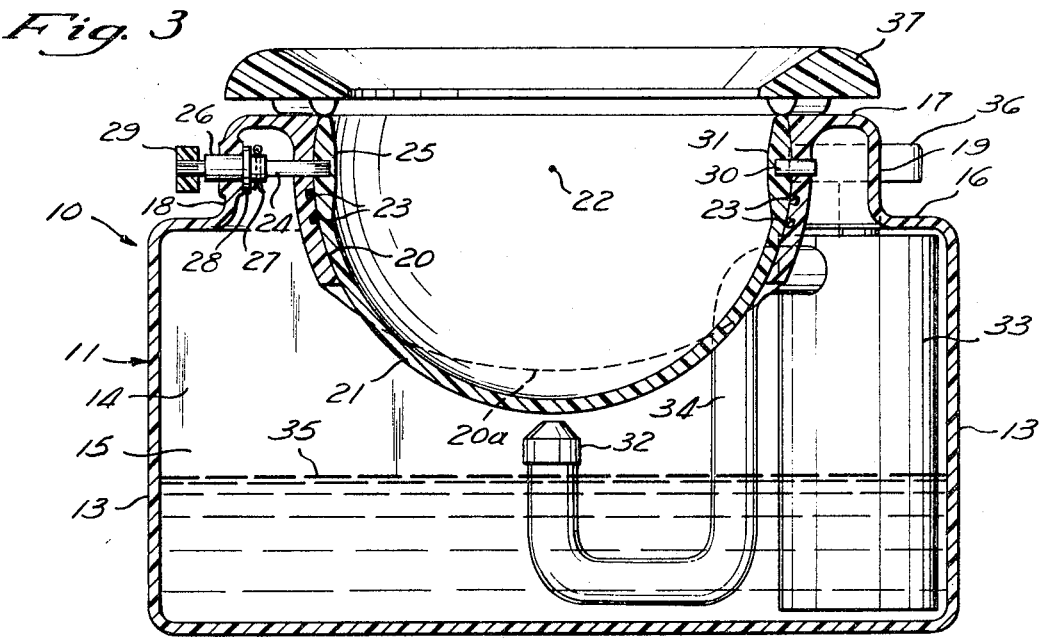
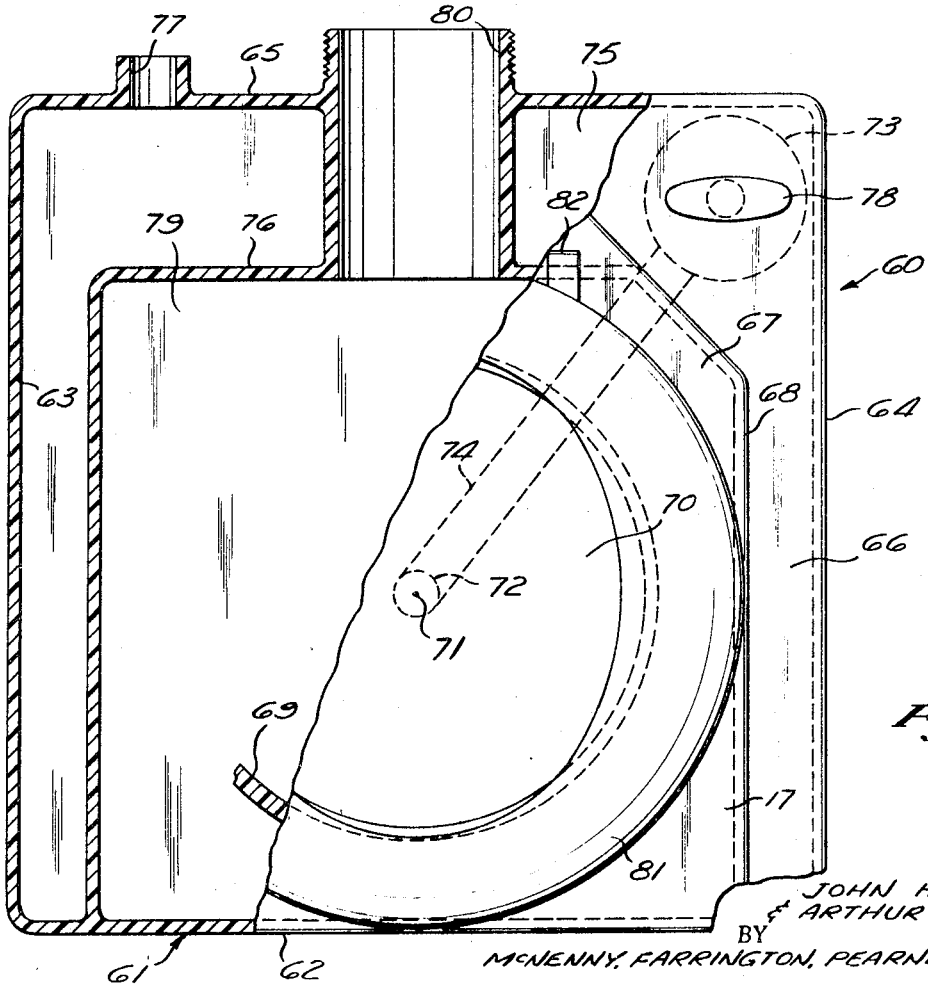

WATER CLOSET

BACKGROUND OF THE INVENTION

This invention relates to waste disposers and, more particularly, to water closets for home or mobile installations. In such installations, there may exist (and in mobile installations, usually does exist) the dual problem of water supply to and waste disposal from the water closet. The problem of waste disposal is particularly acute where the water closet is to be employed as a marine toilet. States have passed laws prohibiting the dumping of raw sewage into their waters and have further prohibited the use of macerator chlorinators which grind and chlorinate the sewage prior to dumping. Macerator chlorinators have not been approved, since they do not appreciably lower the biological oxygen demand of the sewage and, therefore, the sewage removes oxygen from the water. It is necessary, therefore, to retain the sewage in holding tanks for later discharge. Such holding tanks, however, occupy usable space on a boat or mobile home. Furthermore, a flushing water supply to the toilet is a substantial drain on the fresh water supply of the boat or trailer.

To overcome the above-mentioned dual problem, recirculating-type water closets have been proposed. Recirculating-type water closets are self-contained in that they eliminate the need for a water supply to the water closet and the need for a separate holding tank. These water closets include their own reservoir which serves as a holding tank, and further include a pump which circulates flushing solution from the reservoir to the bowl and then the solution is returned to the reservoir. Chemicals are added to the solution to eliminate odor-causing bacteria and the intake end of the pump is protected by a suitable strainer.

Although recirculating-type water closets eliminate the need for a separate fresh water supply and a separate holding tank, a relatively large amount of flushing solution is required for each use, since the solution flow is from outlets at the top of the bowl which direct the flushing solution downwardly in a tangential flow pattern similar to conventional water closets. Thus, although the initial scrubbing force exerted by the flushing solution may be adequate, the scrubbing force is dissipated as the solution reaches the bottom of the bowl. Of course, the use of substantial amounts of flushing solution to clean the bowl is not a problem in an installation wherein the solution is recirculated. However, if the pump is manually operated, it is tiresome and inconvenient to operate the pump to clean the bowl, and if the pump is electrically operated, it may be a drain on the associated power source. It is also desirable to design a recirculating-type water closet so that it may be connected to an external water supply and to an external sewage system or holding tank so that it may be used in homes and buildings having low pressure or inadequate water supplies.

SUMMARY OF THE INVENTION

This invention provides a water closet which overcomes many of the problems associated with recirculating-type water closets and which may be adapted for use in homes or buildings. According to this invention, a water closet is provided which includes a receptacle having a top opening therein. A bowl is mounted within the top opening of the receptacle and the bowl is pivoted to the opening so that it may be inverted after use to empty the contents of the bowl into the receptacle. A spray head is located within the receptacle beneath the bowl to direct a flushing solution against the interior of the bowl while the bowl is in the inverted position. The spray head may be supplied with a flushing solution from an exterior source, or may be supplied with the solution from the receptacle from a manually or electrically operated pump. In the latter case, the water closet would be a self-contained recirculating-type water closet. According to a further aspect of this invention, the receptacle may include a partition to divide the receptacle into two chambers. The pump would be supplied with fresh solution from one of the chambers, and the other chamber would receive waste material. In this instance, the water closet would be nonrecirculating, but would be self-contained.

By providing a spray head within the receptacle to direct the flushing solution against the inverted bowl, substantial savings in solution and time to clean the bowl are effected since the full force of the spray is directed against the bowl and it has been found that such direct impingement shortens the flushing time and thus reduces the volume of fluid needed for proper cleaning.

BRIEF DESCRIPTION OF THE DRAWINGS

FIG. 3 is a cross-sectional view, the plane of the section being indicated by the line 3—3 in FIG. 2;

FIG. 5 is a plan view of a water closet according to another aspect of this invention, with portions broken away to show internal structure in the water closet.

DETAILED DESCRIPTION OF THE INVENTION

Figure 1:
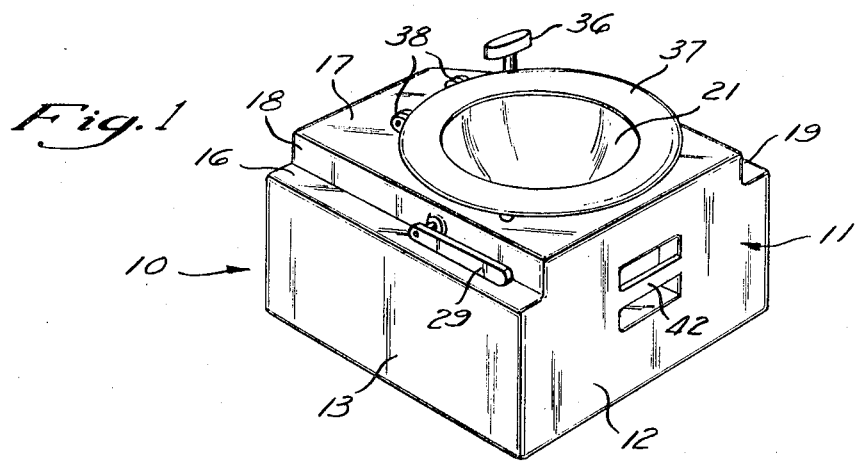
FIG. 1 is a perspective view of a water closet according to this invention.
Figure 2:
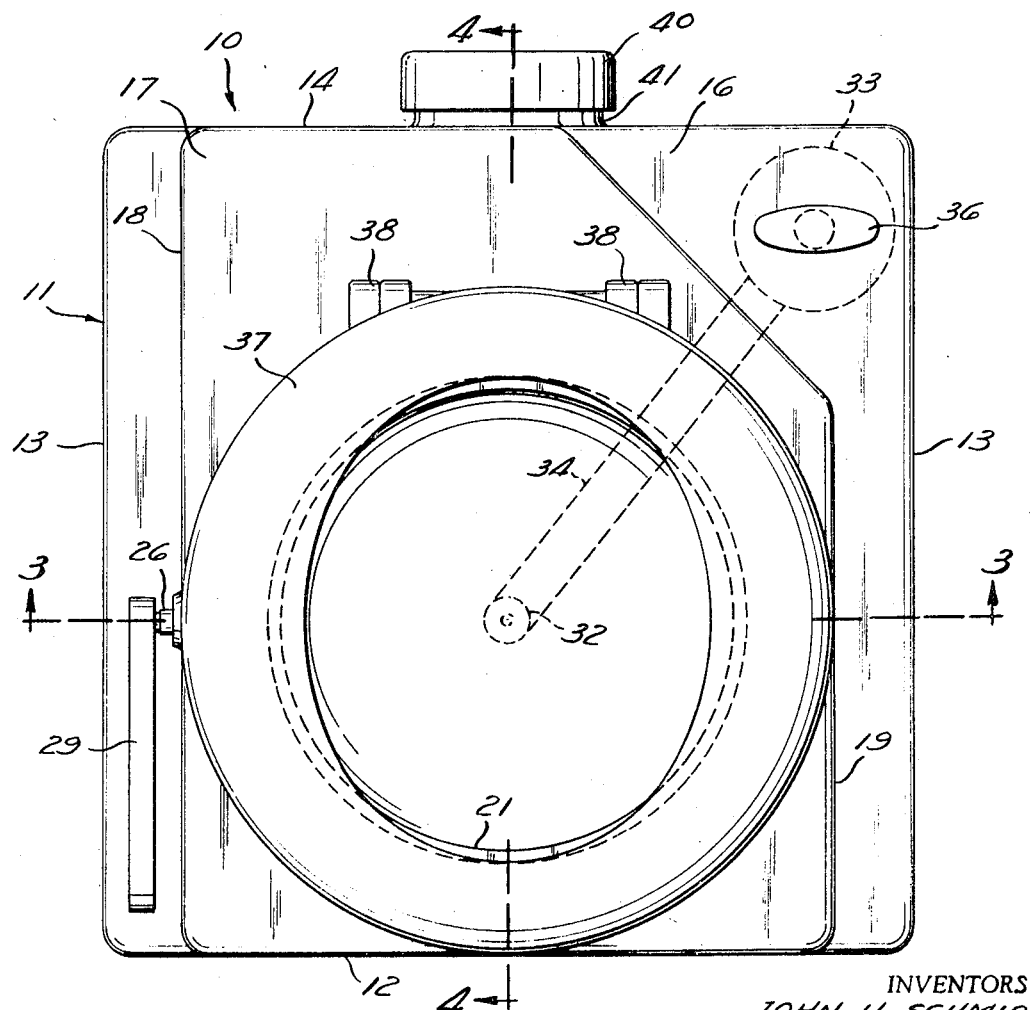
FIG. 2 is a top plan view of the water closet illustrated in FIG. 1.

Referring now to the drawings in greater detail, a water closet 10 is illustrated. The water closet 10 includes a base portion 11 defined by a front wall 12, sidewalls 13, and a rear wall 14. The walls 12, 13, and 14 define a hollow receptacle 15 (FIGS. 3 and 4) which is closed at the top by a top wall 16. The top wall 16 has a raised portion 17 which is bounded by short vertical sidewalls 18 and 19. The base portion 11 may be integrally molded from a suitable plastic by rotational casting techniques, or the top and bottom portions may be separately molded and then bonded together.

Figure 4:
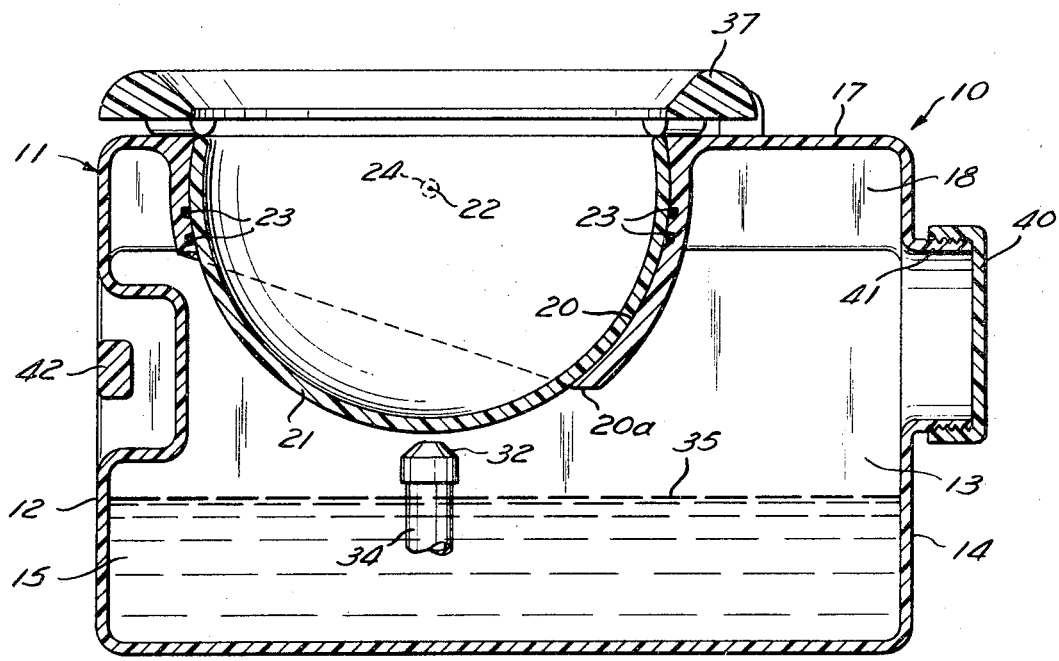
FIG. 4 is a cross-sectional view, the plane of the section being indicated by the line 4—4 in FIG. 2.

The raised portion 17 of the top wall 16 is provided with an opening which is defined by a spherical surface 20 which provides an opening into the receptacle 15. The spherical surface 20 receives a spherical bowl 21. The bowl 21 has an outside surface having a radius of curvature corresponding to the radius of curvature of the surface 20, and that radius has a center at the point 22 (FIGS. 3 and 4). The point 22 is spaced beneath the plane of the raised portion 17 so that the bowl 21 is locked within the surface 20.

It should be appreciated that the bowl 21 need not be spherical as illustrated herein. The bowl 21 may be cylindrical, ellipsoidal, oblate, etc.

Suitable seals 23 are provided between the surface 20 and the outside surface of the bowl 21. A pin 24 extends through the surface 20 and is embedded in an enlarged portion 25 of the bowl 21 so that the pin 24 is fixed to the bowl 21. The pin 24 extends through a bushing 26 and is fixed to the bushing by a cotter pin 27. The pin 24 is restrained from movement away from the bowl 21 by a washer 28 mounted on the bushing 26. The pin 24 extends from the wall 18 and a handle 29 is fixed to that end of the pin 24.

A pivot pin 30 is embedded in an enlarged portion 31 of the bowl 21 and is axially aligned with the pin 24. The pin 30 is pivotally received in the surface 20. The axis of the pin 24 and the pin 30 intersects the point 22 so that movement of the handle 29 through an arc of 180° from its illustrated position will correspondingly rotate the bowl 21 to an inverted position so that the interior of the bowl 21 faces the receptacle 15 and a spray nozzle 32 which is in vertical alignment with the point 22. The seals 23 provide a seal between the surface 20 and the outside surface of the bowl 21 when the bowl is in its upright position and when the bowl is in its inverted position.

The spray nozzle 32 is connected to the output end of a hand pump 33 by a length of tubing 34. The input end of the pump 33 is immersed in a body of fluid 35 contained within the receptacle 15 at a level below the nozzle 32. The input end of the pump 33 may be provided with a suitable screen (not shown), as is customary in recirculating-type water closets.

The pump 33 is provided with an operating handle 36 which extends through the top wall 16.

A suitable seat 37 surrounds the top opening in the wall 16 and is provided with hinges 38.

After use, the bowl 21 is inverted by raising the seat 37 and then rotating the handle 29 through an arc of 180° to discharge the contents of the bowl into the solution 35. While the bowl is in its inverted position, the handle 36 is operated to cause the pump to force the solution 35 through the nozzle 32 and against substantially all portions of the inside of the bowl 21.

The receptacle 15 may be charged with the solution 35 by rotating the handle 29 through approximately 90° to open the receptacle for such filling. Alternately, the receptacle may be filled through a suitable inlet opening (not shown) provided in the water closet above the desired level of the fluid 35. The water closet 10 may be emptied by removing a cap 40 from an outlet tube 41 which communicates with the interior of the receptacle 15. The outlet tube 41 may be provided at any convenient location and, in fact, may be located so that it extends through the bottom of the base portion 11 if the water closet 10 is to be installed at a fixed location with the tube 41 connected to a sewer drain. As may be noted in FIG. 1, a handle 42 is molded into the front wall 12 of the water closet so that the water closet may be carried to a waste discharge station.

As may be noted in FIGS. 3 and 4, the spherical surface 20 has a portion 20a which extends downwardly beyond remaining portions of the surface 20. When the water closet 10 is picked up by the handle 42, the fluid in the receptacle 15 is then confined in part by the extending portion 20a of the surface 20. The inner dimensions of the receptacle 15 are such that the portion 20a will act as a dam for the maximum intended volume of the fluid contained therein when the water closet is picked up by the handle. In such a position, the edge of the portion 20a will be above the highest level of the fluid so that there is no hydraulic head applied to the seals 23.

Although FIGS. 1 through 4 of the drawings illustrate a recirculating-type water closet with a manually operated pump, it should be appreciated that the pump 33 may be electrically driven, and it should be further appreciated that the water closet 10 may be permanently installed as a nonrecirculating unit. In such an instance, the tubing 34 would be directly connected to a home or building water system, and would be provided with a timed valve which would release a metered amount of water to the spray head 32. Also in such instances, the outlet tube 41 would be connected to a sewer drain.

Referring now to FIG. 5, a water closet 60 according to a further aspect of this invention is illustrated. The water closet 60 is self-contained, but is of the nonrecirculating type. The water closet 60 is similar to the water closet 10 in that it includes a base portion 61 defined by a front wall 62, sidewalls 63 and 64, and a rear wall 65. The walls 62, 63, 64, and 65 define a hollow receptacle which is closed at the top by a top wall 66. The top wall 66 has a raised portion 67 which is bounded by a short vertical sidewall 68 and a short vertical sidewall which is not shown but which is similar to the short vertical sidewall 18 shown in FIGS. 1 through 3.

The raised portion 67 of the top wall 66 is provided with an opening which is defined by a spherical surface 69 which provides an opening into the receptacle. The spherical surface 69 receives a spherical bowl 70. The bowl 70 has an outside surface having a radius of curvature corresponding to the radius of curvature of the surface 69 and that radius has a center at the point 71. The point 71 is spaced beneath the plane of the raised portion 67 of the top wall 66 so that the bowl 70 is locked within the surface 69. A handle (not shown but similar to the handle 29) is provided to invert the bowl 70 in a downwardly facing position so that a spray nozzle 72 may direct a flushing solution, such as water, against the interior of the bowl 70. The spray nozzle 72 is connected to the output end of a hand pump 73 by a length of tubing 74. The input end of the pump 73 is immersed in a body of fluid (not shown) contained within a first reservoir 75 which is defined by the walls 62, 63, 64, and 65, and by an inner wall 76 which extends from the bottom of the water closet to the top wall 66. The first reservoir 75 may be filled with fresh flushing solution through an inlet opening 77 which extends through the backwall 65 above the desired level of the solution. The pump 73 is provided with an operating handle 78 which extends through the top wall 66 and which supplies fluid from the first reservoir 75 to the inside of the inverted bowl 70. Spent flushing solution falls within a second reservoir 79, which is defined by the wall 76 and the front wall 62. Spent flushing solution may be emptied from the second reservoir 79 through a conduit 80 which extends through the wall 76 and the back wall 65 of the water closet 60. A suitable step (not shown) may be provided over the outlet end of the conduit 80.

A suitable seat 81 surrounds the top opening in the wall 66 and is provided with hinges 82.

It should be appreciated that in the embodiment shown in FIG. 4, the conduit 80 may be connected to a sewage line or holding tank if the water closet is installed in a permanent location.

It should also be appreciated that other partitioning arrangements may be provided to divide the first and second reservoirs. For example, the fresh solution reservoir may be located above a horizontal partition (not shown) which extends inwardly from the walls 62, 63, 64 and 65 and then upwardly to join the surface 69 to thereby form an annular reservoir. The spent flushing solution reservoir would be located beneath the fresh solution reservoir and, of course, the pump inlet would be located in the fresh solution reservoir.

The invention is not restricted to the slavish imitation of each and every detail set forth above. Obviously, devices may be provided which change, eliminate, or add certain specific details without departing from the scope of the invention.

We claim:

1. A waste collector and disposer comprising means defining a receptacle, means defining a top opening in said receptacle, bowl means mounted within said top opening, said bowl being movable from a position wherein the interior of said bowl means faces upwardly to collect waste to an inverted position wherein all portions of the interior of said bowl means face downwardly to dispose said waste into said receptacle, and cleaning means within said receptacle to clean the interior of said bowl means when said bowl means is in its inverted position, said cleaning means comprising an upwardly directed nozzle having a discharge end directed toward upper portions of the interior of the bowl when the bowl is in its inverted position, said discharge end being positioned beneath the bowl when the bowl is in its upright position.

2. A water closet comprising means defining a receptacle, means defining a top opening in said receptacle, seat means surrounding said opening, bowl means mounted within said top opening and having an upper rim substantially adjacent to said seat means, means for moving said bowl means from a position wherein the interior of said bowl means faces upwardly to an inverted position wherein all portions of the interior of said bowl means face downwardly to empty the contents of said bowl means into said receptacle, and cleaning means comprising an upwardly directed nozzle having a discharge end directed toward upper portions of the interior of the bowl when the bowl is in its inverted position, said discharge end being positioned beneath the bowl when the bowl is in its upright position.

3. A waste collector and disposer comprising means defining a receptacle, means defining a top opening in said receptacle, bowl means mounted within said top opening, sealing means providing a seal between said opening and said bowl means, means for moving said bowl means from a position wherein the interior of said bowl means faces upwardly to collect waste to an inverted position wherein all portions of the interior of said bowl means face downwardly to dispose waste into said receptacle, said sealing means providing said seal in both positions of said bowl means, and cleaning means comprising an upwardly directed spray head having a discharge end directed toward upper portions of the interior of the bowl when the bowl is in its inverted position, said discharge end being positioned beneath the bowl when the bowl is in its upright position.

4. A waste collector and disposer according to claim 3, including means connecting said spray head to a flushing solution.

5. A waste collector and disposer according to claim 4, wherein said connecting means includes a tube and wherein said tube is connected to a pump which delivers the flushing solution to said spray head under pressure.

6. A waste collector and disposer according to claim 5, wherein said pump is manually operated.

7. A waste collector and disposer according to claim 5, wherein said pump is adapted to recirculate flushing solution directed toward the interior of said bowl by said spray head back to said spray head.

8. A waste collector and disposer according to claim 5, wherein said receptacle includes partition means dividing said receptacle into first and second reservoirs, said pump having its input end located in said first reservoir and said bowl being located over said second reservoir.

9. A waste collector and disposer according to claim 4, wherein said connecting means includes a tube adapted to be connected to a building or home water system.

10. A water closet comprising means defining a receptacle, means defining a top opening in said receptacle, a seat surrounding said opening, said top-opening-defining means including a wall formed by a spherical segment, a spherically shaped bowl mounted within and pivotally held by said wall and having an upper rim substantially adjacent to said seat, a rod extending through said receptacle and fixed to said bowl to pivot said bowl from a position wherein the interior of said bowl faces upwardly to an inverted position wherein all portions of the interior of said bowl face downwardly to empty the contents of said bowl into said receptacle, cleaning means within said receptacle to direct a cleaning agent against the interior of said bowl when said bowl is in its inverted position, said cleaning means comprising an upwardly directed spray head having a discharge end directed toward upper portions of the interior of the bowl when the bowl is in its inverted position, said discharge end being positioned beneath the bowl when the bowl is in its upright position.

11. A water closet according to claim 10, including means connecting said spray head to a flushing solution.

12. A water closet according to claim 11, wherein said connecting means includes a tube and wherein said tube is connected to a pump which delivers the flushing solution to said spray head under pressure.

13. A water closet according to claim 12, wherein said pump is manually operated.

14. A water closet according to claim 12, wherein said pump is adapted to recirculate flushing solution directed toward the interior of said bowl by said spray head back to said spray head.

15. A water closet according to claim 12, wherein said receptacle includes wall means dividing said receptacle into first and second reservoirs, said pump having its input end located in said first reservoir, and said bowl means being located over said second reservoir.

16. A water closet according to claim 11, wherein said connecting means includes a tube adapted to be connected to a building or home water system.

17. A water closet comprising means defining a receptacle, means defining a top opening in said receptacle, seat means surrounding said opening, said top opening defining means including wall means extending into said receptacle and forming a socket, bowl means mounted within said socket, sealing means providing a seal between said wall means and said bowl means, said bowl means being movable from a position wherein the interior of said bowl means faces upwardly to collect waste to an inverted position wherein the interior of said bowl means faces downwardly to dispose said waste into said receptacle, said receptacle being adapted to contain a maximum volume of fluid having a level which is in closely spaced adjacency with respect to the bottom of said bowl means when said bowl means is in its upright position, means for carrying said water closet in a position wherein said top opening is in a vertical position, said wall means extending between said bowl means and the level of said maximum volume of fluid contained within said reservoir when said top opening is in said vertical position to prevent any substantial hydraulic pressure on said sealing means.

18. A water closet according to claim 17, including cleaning means within said receptacle to clean the interior of said bowl means when said bowl is in its inverted position, said cleaning means comprising an upwardly directed nozzle having a discharge end directed toward the interior of the bowl when the bowl is in its inverted position, said discharge end being contained within the receptacle when the bowl is in its upright position.

19. A water closet according to claim 17 wherein portions of said wall means extend downwardly into said receptacle beyond other portions of said wall means.

20. A water closet according to claim 19 wherein said receptacle includes vertical walls, wherein said carrying means is provided on one of said walls, and wherein said downwardly extending wall portions are adjacent the vertical wall opposite said one of said walls.

21. A water closet comprising a receptacle having a top wall, a top opening in said top wall, a seat surrounding said top opening, a spherical socket extending downwardly from said top opening, a spherical bowl mounted within said socket, said spherical bowl having a centerline substantially parallel to and disposed beneath said top wall, sealing means between said bowl and said socket, said spherical bowl being pivotally movable about said centerline from a first position wherein the interior of said bowl faces upwardly to an inverted position wherein all portions of the interior of said bowl face downwardly to empty the contents of said bowl into said receptacle, said sealing means forming a seal between the bowl and socket when said bowl is in its first position and when the bowl is in its inverted position, cleaning means within said receptacle to direct a cleaning agent against the interior of said bowl when said bowl is in its inverted position.

22. A water closet according to claim 21 wherein said bowl includes an upper rim substantially adjacent said top wall when said bowl is in said first position, and said rim is disposed beneath said top wall and said centerline when said bowl is in said inverted position.

* * * * *